United States Patent [19]

Coueron

[11] Patent Number: 4,895,469

[45] Date of Patent: Jan. 23, 1990

[54] LOCKING FASTENER

[75] Inventor: Jacques R. Coueron, Saint Nazaire, France

[73] Assignee: Eaton Corporation, Cleveland, Ohio

[21] Appl. No.: 320,196

[22] Filed: Mar. 6, 1989

[30] Foreign Application Priority Data

Mar. 11, 1988 [GB] United Kingdom ............... 8805829

[51] Int. Cl.4 .............................. B25G 3/00
[52] U.S. Cl. ..................... 403/21; 403/362; 411/324
[58] Field of Search ............... 403/21, 362; 411/301, 411/353, 517, 324

[56] References Cited

U.S. PATENT DOCUMENTS 4,470,735 9/1984 Salisbury .................. 411/517 X

FOREIGN PATENT DOCUMENTS 907139 11/1950 Fed. Rep. of Germany ...... 403/362
720212 3/1980 U.S.S.R. ............................ 411/324

Primary Examiner—Andrew V. Kundrat
Attorney, Agent, or Firm—H. D. Gordon

[57] ABSTRACT

A transmission shift yoke (3) (see FIG. 2) has to slide over the shift bar (1) and then be anchored accurately in the desired position by a fastener, i.e., set screw or bolt (8). The set screw must be locked to prevent its loss or more seriously its falling into machinery. A expansible snap ring (10) is arranged on a spotface (11) in a recess (12) in the bar; it is expanded by the tapered shank (14) of the fastener (8) and then snaps into a waist (19) of the fastener to prevent its being readily unscrewed more than half a turn or so. A really robust torque, however, on the head (9) by means of a spanner/wrench will forcibly expand the snap ring out of the waist (19) and over the widest part of the tapered shank (13).

5 Claims, 4 Drawing Sheets

LOCKING FASTENER

BACKGROUND OF THE INVENTION

1. Field of the Invention

The present invention relates to locking structure for an externally threaded fastener, e.g., a screw or bolt, to inhibit its becoming totally unthreaded by accident (for instance through vibration or insufficient tightening) from an object having an internally threaded through bore through which the externally threaded fastener extends.

2. Description of the Prior Art

Structures to prevent the total unintended unthreading of external threaded fasteners from threadably engaged internally threaded objects are well known in the prior art.

Such unthreading cannot only lose the fastener but also cause it catastrophically to fall into meshing gears, machinery or high-voltage electrics, etc. Prior art fastener lock structures and methods comprise sticky or viscous or setting substances in the threads, which have only a limited time of effectivity friction devices in the threading, and/or wire passed through a hole in the fastener. The use of lock wires is expensive and time consuming although reliable.

SUMMARY OF THE INVENTION

In accordance with the present invention, the drawbacks of the prior art are managed or overcome by the provision of a relatively simplified externally threaded fastener locking structure, without losing reliability when the fastener locates two objects in a direction transverse to the axis of the threading. In general, a tapered end of the fastener, having passed with clearance through a threaded through bore of a first one of the objects, will progressively engage the second object with a taper to taper contact, e.g., conical end to conical blind hole or depression, thereby giving a precise desired transverse relationship when an intermediate threaded portion of the fastener engages said threaded portion of the first object.

Thus the invention will feature a fastener (8) having, in axial order, a manipulating portion, e.g., bolt head (9), by which the fastener can be turned, a threaded shank portion (7) for screwing through a complimentary threaded hole (6) in a first object (3) and a tapering or conical end portion (13) for engaging Progressively slidingly, e.g., taper-to-taper with a tapered side (14) in a receiving hole (15) in a second object (1). Such fasteners are well known.

The inventive fastener is characterized by an annular region of reduced cross-section, such as a groove (19) between the end portion and the threaded portion.

The known tapered portion and the characterizing annular groove will cooperate with a radially expansible spring or resilient clip (10), e.g., the well-known "Circlip" as follows. The clip should slide over the groove and part only of the taper without expansion. The wider part of the taper must only be forcible through the clip by resiliently expanding it.

The two objects (1 and 3) must cooperate to present an internal groove (11) in which the clip is easily accommodated. The objects must be held together by other means, e.g, the second object is a sliding fit inside the first, as presently preferred.

Further inventive objects and features will appear from the following description of the drawings.

DESCRIPTION OF THE PREFERRED EMBODIMENT

Figure 1:
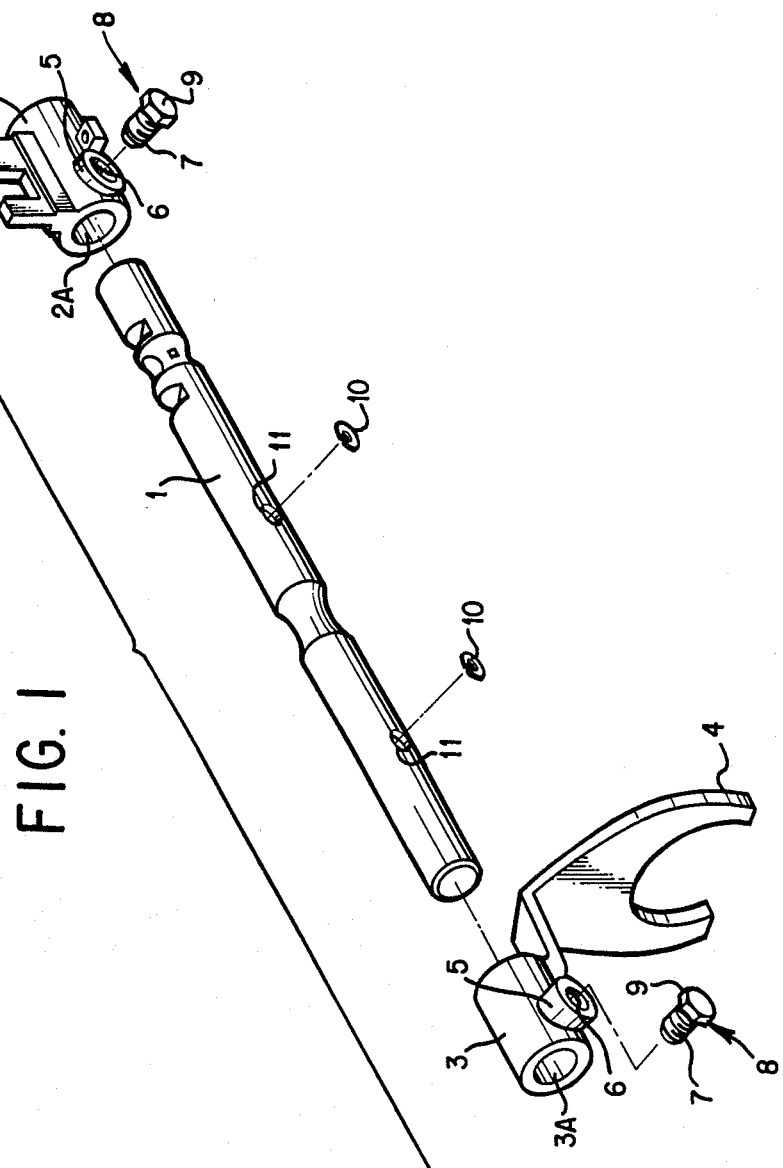

FIG. 1 illustrates, in an exploded perspective view, a transmission shift bar having a shift yoke and a shift block attached thereto by a fastener including the fastener locking structure of the present invention. Transmissions utilizing such shift bars or shift rails are known in the prior art as may be seen by reference to U.S. Pat. Nos. 4,748,863; 4,736,643 and 4,290,515, the disclosures of which are hereby incorporated by reference.

While the fastener locking structure/assembly of the present invention is particularly well suited for use in connection with transmission shift rails, the invention is not limited to such use.

Referring to FIG. 1, a rigid shift bar 1 must communicate both axial and rotational displacements between a shift block 2 as a driving member and a shift yoke 3 as a driven member. Shift block 2 may receive input motions from a manual. lever or gear stick not shown, and shift yoke 3, driven to move similarly has to cause selector fork 4 to engage and then move clutches or gears (not shown). Both movements are small and critical, so block 2 and yoke 3 must both be attached to bar 1 with negligible play or uncertainty, whether axial or rotational, in relative positioning. The driving and driven members can be interchanged, in that yoke 3 could drive the block, if required.

Accordingly the bar is a good slidable fit within respective apertures 2A and 3A in the driven and driving members (it must be slidable for assembly, dismantling for service and so on), yet the bar 1 must not slide or twist relative to the block 2 or the yoke 3 after assembly. Moreover, the set or locking screws 8 must not fall out even if they do work loose, since not only their loss and the relative unrestricted sliding of bar, block and yoke, but also damaged machinery could result. Moreover the screws, if they do work loose, should only be allowed a small freedom of unscrewing movement because only a correspondingly small freedom of relative sliding may be between the yoke or block and the shift bar acceptable.

Embodying the invention, block 2 and yoke 3 have bosses 5 with internally threaded holes 6 to fit cooperating externally threaded shanks 7 on fasteners 8 having usual bolt heads 9 for spanners/wrenches. These features are known but the fasteners 8 also have a tapered end and an intermediate groove for cooperating with snap rings 10. Also the shift bar has a spot face diameter 11, being a shallow disc-shaped recess or depression, to house the snap ring 10 and a tapered blind hole to accept a conical end of the fastener. Further details will become more apparent from FIGS. 2-6, which shows yoke 3 and its aperture 3A but not block 2, which is identical as far as sliding and locating on the shift bar are concerned.

It should be emphasized that the present invention is not restricted to vehicle ratio shifters or to a second object slidably closely fitting in a first object, such as bar 1 in block 2 or yoke 3, although this is a very suitable application.

Figure 2:
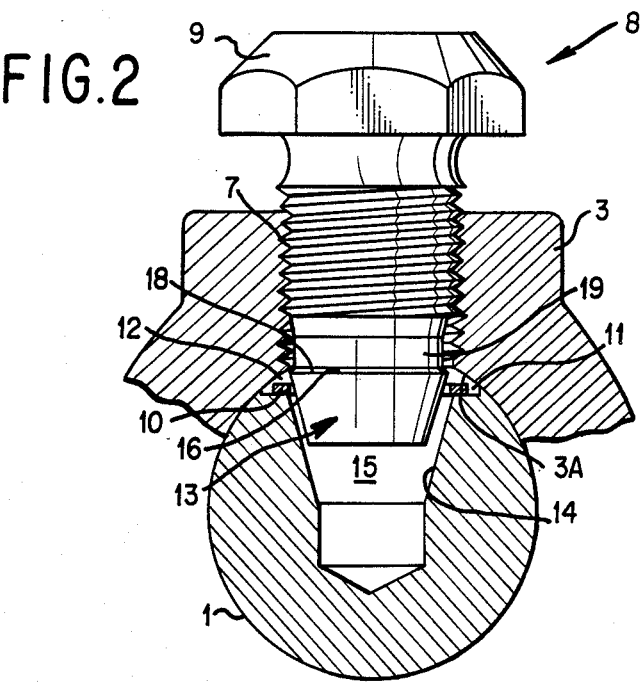
FIGS. 2-6 show in partial side section view stages in tightening and accidental loosening of the fastener in engagement with the other components seen in FIG. 1.

Referring briefly again to FIG. 1, each snap ring 10 is fitted in a spotface 11 before the first object (yoke 3 or block 2) is slid over it on the second object (bar 1). Referring now to FIG. 2, spotface 11 forms, in cooperation wit the aperture 2A or 3A, an annular cavity 12 in which resiliently expansible spring clip 10 is shown an easy fit axially and exteriorly just before being resiliently expanded by the conical end 13 of the fastener 8. FIG. 2 shows the fastener thread 7 engaged in yoke 3 (which is only shown in part) but not fully screwed hom, i.e., the tapered end 13 is not yet in contact with the tapered sides 14 of the conical blind hole 15 in second object 3. Up to this point, turning can be effortless, by hand. It is noted that yoke 3 is supported by shift bar 1 and that fastener 8 is used to axially and/or rotationally fix the yoke to the bar.

Figure 3:
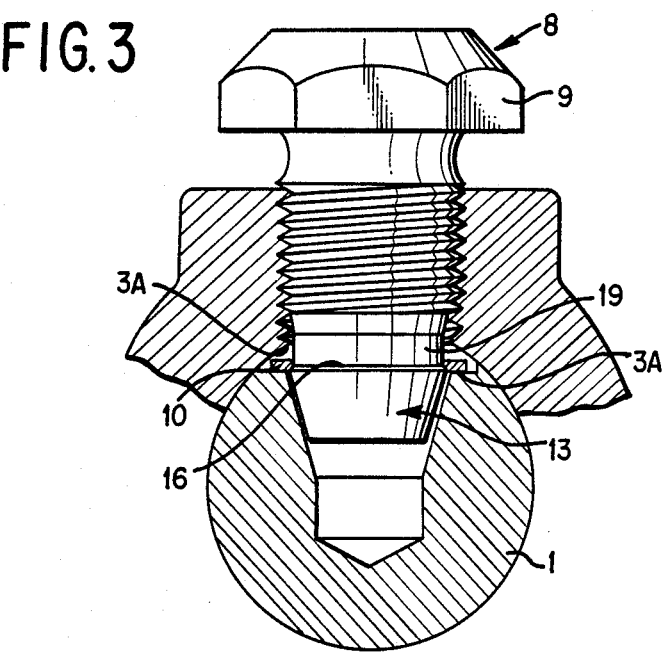
Figure 4:
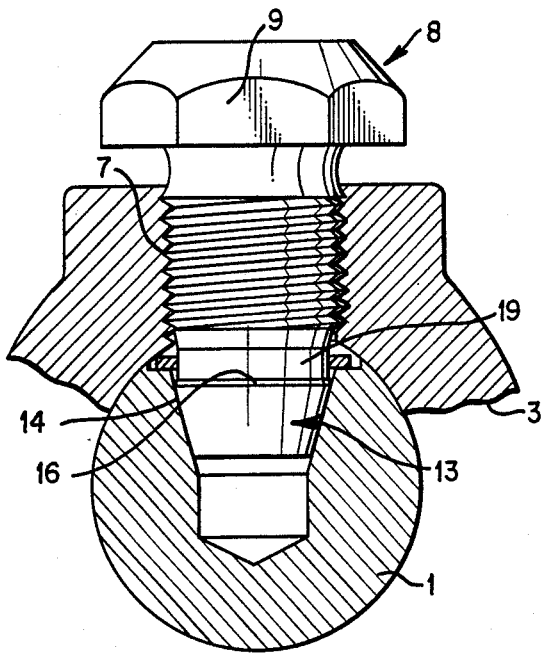

Further turning of bolthead 9 will encounter resistance, because the cone first contacts, then expands spring clip 20 into housing 12 from the condition in FIG. 2 to that in FIG. 3 when the widest part 16 of conical end 13 has expanded clip 10 as much as needed. This turning requires a spanner/wrench or torque gun. The clip 10 is now about permitted to snap back into an annular waist or groove 19 in fastener 8, as shown in FIG. 4, when the mating tapered surfaces 13 and 14 have engaged with each other and fastener 8 is fully home. There is now no transverse play between shaft 1 and yoke 3 or block 2 and their transverse relative location is precise, with precise torquing of head 9.

Alternatively, head 9 may be provided with a slot or the like for receipt of a blade, Allen or Phillips head screwdriver.

Figure 5:
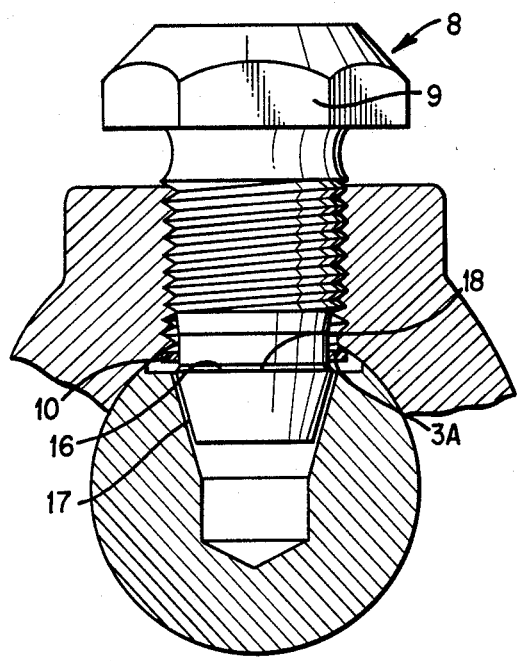

Preferably, thread 7 had received setting, hardening or viscous filler such as "Loctite" inserted in the internally threaded bore 6, or applied directly to thread 7, before assembly. Otherwise the screw may back-off a small amount (e.g., between one-half and one whole turn) due to vibration, etc., before the widest part 16 abuts and locks against the now contracted spring washer 10 as shown in FIG. 5. There is now a small but acceptable maximum amount of transverse relative freedom between the first and second objects, as evidenced by the separation 17 depicted between the mating tapered surfaces.

Figure 6:
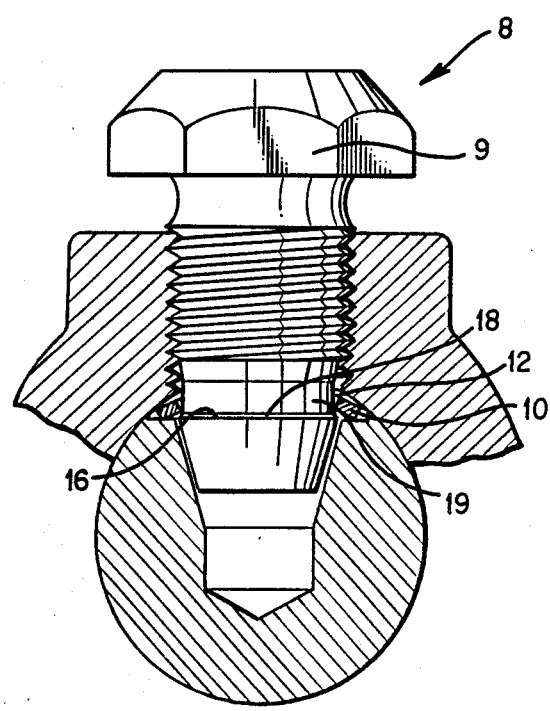

Even major vibrations will fail to unloosen the screw any further, so it cannot get dislodged and fall into gears etc., unless enough effort is applied to abut and distort spring clip 10 with the steep ramp 18 at the widest part 16 of the taper, as shown in FIGS. 5 and 6. The recess 12 should be designed, in cooperation with apertures 2A and 3A of the driving and driven members, to allow sufficient space for the spring clip 10 to dish as shown, unless it will be never required to remove fastener 8, e.g., for servicing or replacements. Once the widest part 16 of the taper 13 has passed clip 10, the latter will be dislodged from the groove 19, and minimal or hand torque will unscrew the fastener (just enough to break any residual "loctite" seal).

Of course the clip may be dished enough to need replacement, to perhaps be resilient enough to use again when assembled reverse side down. The advantage of wiring the fastener head is thus preserved, in that only one turn or less of freedom to unscrew is permitted.

Thus the combination of intermediate groove 19, recess 8, and spring clip 10 when assembled as described above, (a) permits only minimal uncertainty in transverse and rotatory position, in the case of objects which need to be transversely located, e.g., by known tapering as described above but do not need to be pressed together; if desired, a finite minimal uncertainty or play can even be built in; and (b) reliably prevents potentially dangerous loosening or unfastening in robust operation, without giving the complications in assembly of the manufacturer having to drill and wire all the fastener heads.

The spring or resiliently expansible washer 10 should be dimensioned in combination with fastener 8, such that the tapered end 13 can enter washer 10 partially without expanding it, then end 13 can expand it, then after passage of widest part 16, the washer 10 can relax back to an unexpanded or less expanded state.

The bar 1 has a hole 15 able to receive the tapered end 13, and an annular volume 12 recessed therein, whereby in cooperation with the yoke or block to receive the spring washer even in its expanded state. The other body 3, yoke or block 2 has a threaded aperture 6 into its axial bore 2A or 3A through which the shank 7 of threaded fastener 8 can be screwed. The bores and recess cooperate to allow the washer to expand into volume 12, but not to permit the widest part 16 or ramp 18 of the fastener to be withdrawn without dishing the washer as well as expanding it.

I claim:

1. A self-locking assembly for fixing a first object (2 or 3) to a locating station on a second, elongated object (1) over which the first object can slide longitudinally, said station being defined by a conical receiving hole (15) and an annular recess (11) surrounding the mouth of the hole, said first object (2 or 3) having longitudinal bore (2A or 3A) to receive the second object (1), and having an internally threaded bore (6) extending generally radially of and intersecting its longitudinal bore (2A or 3A), said assembly comprising an externally threaded fastener (8) for threadable engagement in said internally threaded bore, said externally threaded fastener (8) comprising in axial order, a gripping portion (9), by which it may be rotated, a threaded shank portion (7) and a tapered down portion (13); said assembly characterized by said externally threaded fastener including a waist region (19), of reduced cross-section and axially intermediate the tapered portion (13) and the shank portion (7) and a circular spring clip (10) able when unexpanded to slide over a distal part only of the axial length of the tapered portion, and able when expanded to slide also over the entire length of the tapered portion (13).

2. The assembly of claim 1 further characterized in that the waist region (19) is joined through a ramped shoulder (18) to the proximal, larger end (16) of the tapered portion (7), said clip able when expanded to slide over said ramped shoulder.

3. The assembly of claim 2 characterized in that, when the externally threaded fastener shank (7) is threaded into the internally threaded bore (6) of the first object (1), with the tapered fastener portion received by said conical hole (15), said recess lies generally surrounding the waist region (19) of the fastener (8).

4. The assembly of claim 1 characterized in that the longitudinal bore (2A or 3A) of the first object can cooperate with the recess (11) of the second object and the waist region (19) of the fastener to allow accommodation of a circular spring clip (10) which has slid over the tapered portion onto the waist region (19) of the fastener, but to prevent removal of the clip (10) without its distortion by attempts to unscrew the fastener, once the fastener has been received in the conical hole (15); except for a small finite extent of axial relative movement therebetween.

5. The assembly of claim 4 characterized in that clip can be removed after substantial dishing thereof by more forceful attempts to unscrew the fastener (8).

* * * * *